May 2, 1933. E. J. W. RAGSDALE 1,907,002
SHEET METAL AIRPLANE STRUCTURE
Filed Oct. 5, 1931
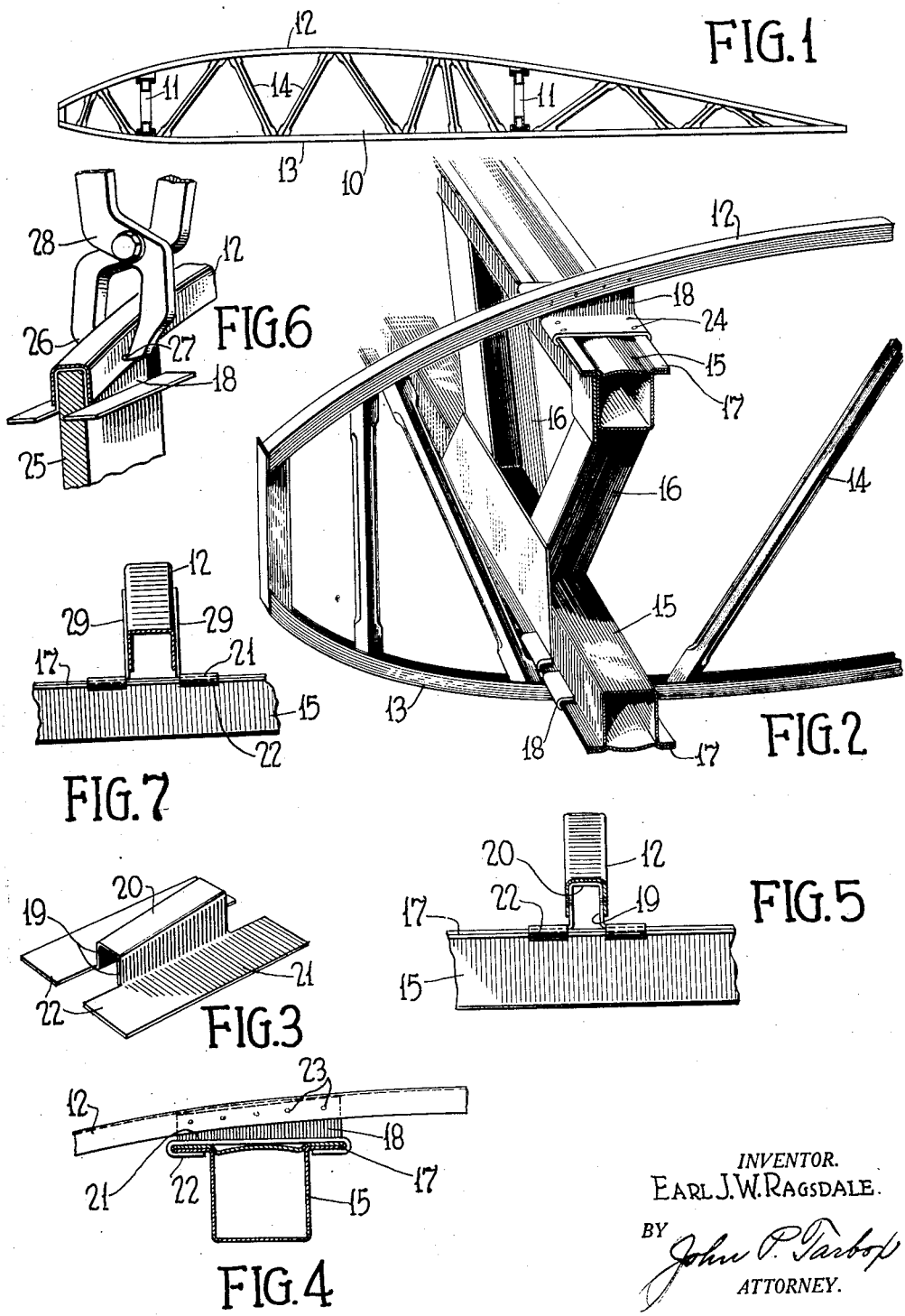
INVENTOR.
EARL J. W. RAGSDALE.
BY
John P. Tarbox
ATTORNEY.

Patented May 2, 1933

1,907,002

UNITED STATES PATENT OFFICE

EARL J. W. RAGSDALE, OF NORRISTOWN, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

SHEET METAL AIRPLANE STRUCTURE

Application filed October 5, 1931. Serial No. 566,834.

The present invention relates to sheet metal frame structures and especially the frame structure for aircraft wings fabricated from structural elements formed from strip sheet metal such as stainless steel spot welded together.

It is directed more specifically to an improved joint structure for joining the trussed ribs of a wing to the spar or spars also formed of sheet metal, and its main object is to provide a joint structure for joining a non-flanged, channel section, chord member of a trussed rib to a transverse, flanged spar member of sheet metal, in a manner to strengthen the parts in the neighborhood of the joint and simplify the mode of fabrication.

Another object is the provision of a joint element which will permit the use of a simple jig to hold the elements, to be joined, in proper position for joining, and form part of the spot welding circuit in a manner enabling two welds to be made simultaneously, one at each side of the channel section chord member of the rib.

A further object is the provision of a joint element so related in form to the form of the spar element as to permit the ribs to be secured to the spar by a crimped or clinched engagement of the joint element with the spar, either as the sole means of attachment between the joint element and the spar or for holding the parts in assembled position for welding the joint element to the spar.

Various other objects of the invention will be apparent from a perusal of the following specification and the drawing accompanying the same.

In the drawing, Fig. 1 is a side elevation of a rib of an airplane wing, with the spars shown in section.

Fig. 2 is a fragmentary perspective view of the leading edge of a wing showing the completed joint between the rib and the spar.

Fig. 3 is a perspective view of a joint element.

Fig. 4 is a side elevation of the completed joint with the chord member of the spar shown in section.

Fig. 5 is a front elevation of the completed joint with the chord element of the rib in section.

Fig. 6 is a fragmentary perspective view illustrating the method of making the complete joint.

Fig. 7 is a front elevation similar to that of Fig. 5 but showing a modified form of completed joint.

Referring to the drawing in detail, the invention is here shown as applied to the fabrication in sheet steel of the frame of an airplane wing consisting of trussed ribs 10, as shown in Fig. 1, joined to transverse spar members 11. The rib 10 is formed of the upper and lower channel sectioned chord members 12 and 13 joined by a webbing of strut elements 14, the chord members being curved to the contour of the wing and arranged with the channel openings facing inwardly to receive the ends of the strut elements which are spot welded thereto. This rib construction is similar generally to that shown in my application Serial No. 456,993, filed May 29, 1930, but the particular construction of the rib is not an essential feature of the present invention except as to the form of the chord member which in any case should be of channel section with the channel openings fastened inwardly of the rib. The spar elements 11 are trussed structures fabricated, as shown in detail in Fig. 2, of a pair of chord members 15 joined by a webbing of strut elements 16, the chord members being of hollow box section with flanges 17, the spar element being similar to that shown and described in my application Serial No. 565,974, filed September 30, 1931, and may be of any type having flanges similar to those indicated at 17 and similarly arranged with respect to the spar structure.

Connection is effected between the rib and the spar through the joint 18 which, before the completion of the joint, are of the form shown in perspecive in Fig. 3. Each consists of a pair of side plates 19 bridged by a connecting wall portion 20 to form a channel section adapted to be nested in the channel of a chord member 12 or 13 of the rib. Extending laterally outward from the edge of each side plate is a flange 21 provided at each side with a longitudinal extension forming a clinching lug 22. In joining the rib to the spar through this joint element, the channel shaped portion of the joint element is first nested in the channel of the chord of the rib, and the sides of the two thus nested channels secured together preferably by spot welding, as indicated by the spot welds 23 in Figs. 2 and 4, the joint element being so positioned on the rib that the flanges 21 will overlie the generally, flat top portion of the adjacent chord member 15 and its side flanges 17. The joint element is then secured to the chord member 15 by bending the clinching lugs 22 around under the flanges 17 in clinched or clamping engagement therewith. It has been found in practice that this clinched fastening is sufficient in most instances, but where additional assurance against lateral displacement is desirable spot welds are made through the flange 21 and the embraced portion of the flanges 17 to the turned under portion of the clinching lug as indicated at 24 in Fig. 2.

The present type of joint lends itself particularly well to spot welding by the method illustrated in Fig. 6, according to which method the joint element 18 is nested in the channel chord member of the rib with a current conducting jig member 25 nested in the channel portion of the joint element as shown in Fig. 6, to make electrical contact therewith and at the same time hold the parts in place for welding. The jig member 25 may be part of the jig used in forming the rib and having several such conducting members 25, one wherever a joint element 18 is to be secured to the rib. The jig member 25 is made of some good conducting material, such as copper, and fits snugly in the channel portion of the joint element 18 so as to make a good electrical contact with the latter and also force the latter into good electrical contact with the side walls of the channel rib member. This enables two good spot welds to be made simultaneously, one between each side plate of the joint element and the adjacent side wall of the channel rib member, by series welding between a single pair of welding points such as the points 26 and 27 of a pair of ordinary welding tongs 28, indicated in part in Fig. 6. In the making of this series weld, it being understood of course that the hinged tong sections are insulated as usual, the welding current passes along one tong section to the welding point 26 through the side walls of the rib channel 12, the side plates of the joint element 18 and the jig member 25 in series to the other welding point 27, and back to the source through the other tong section. Several welds may thus be made along the joint without removing the parts from the jig, and without the necessity of having to position the tongs with one welding point within the channel for each single weld to be made. After the joint elements 18 are thus welded in place, the jig and rib structure are separated and the ribs placed in position on the spars as indicated in Fig. 2, with the flanges of the joint elements engaging the adjacent surface of the spars after which the fastening by clinching, followed by spot welding, if desired, is proceeded with as previously described.

A modified form of the joint element is shown in Fig. 7 in which the joint element is made in two parts by omission of a connecting wall between the side plates 29 each side plate being provided with a laterally extending flange 21 and clinching lugs 22 the same as in the first described modification, the flanges and clinching lugs serving the same purpose in the finished joint as the similar portions in the previously described modification.

While certain specific embodiments of the invention have been herein shown and described for the sake of disclosure, it is to be understood that the invention is not limited to such specific embodiments but contemplates all such modifications and variations thereof as fall fairly within the scope of the appended claims.

What is claimed is:

1. A joint element for connecting the channel sectioned chord member of a trussed rib to the flanged chord member of a transverse spar comprising a side face portion adapted to be secured to a side wall of the channel section chord member of the rib, a flange arranged to overlie the chord member of the spar and clinching lugs carried by said flange and independently of said side portion and arranged to be clinched around the flanges of the chord member of the spar.

2. A joint element for attaching the channel sectioned chord members of a trussed rib to a flanged chord member of a transverse spar, comprising a channel sectioned portion arranged to be nested within a channel sectioned chord member of the rib, a flange extending laterally outward from the edge of each side wall of the said channel sectioned portion arranged to overlie a flanged chord member of the spar, and a pair of clinching lugs on each said laterally extending flange independently of the side portion arranged to extend beyond the flanges of the chord member of the spar and to be clinched around the flange of the spar.

3. A joint structure securing the channel sectioned chord member of a rib to a flanged chord member of a spar, comprising a side plate of sheet metal welded to a side wall of said channel sectioned chord member, a securing flange extending laterally from the side plate and overlying the flanged chord member and its flanges, and a pair of lug extensions on each side of the securing flange clinched around the flanges of the chord member.

4. A joint structure securing the channel sectioned chord member of a rib to a flanged chord member of a spar, comprising a side plate of sheet metal welded to a side wall of said channel sectioned chord member, a securing flange extending laterally from the side plate and overlying the flanged chord member and its flanges, and a pair of lug extensions on each side of the securing flange clinched around the flanges of the chord member and spot welded thereto.

5. A joint element for connecting a cross rib to a flanged beam member comprising a side face portion adapted to be secured to a side of the rib, a flange arranged to overlie the beam member, and clinching lugs carried by said flange independently of the side portion and arranged to be clinched around the flanges of the beam.

In testimony whereof I hereunto affix my signature.

EARL J. W. RAGSDALE.